United States Patent
Wallerstein

[11] Patent Number: 5,955,961
[45] Date of Patent: *Sep. 21, 1999

[54] PROGRAMMABLE TRANSACTION CARD

[76] Inventor: Robert S. Wallerstein, 9782 Tottenham Ct., Beverly Hills, Calif. 90210

[*] Notice: This patent is subject to a terminal disclaimer.

[21] Appl. No.: 08/719,437

[22] Filed: Sep. 25, 1996

Related U.S. Application Data

[63] Continuation-in-part of application No. 08/236,169, May 2, 1994, Pat. No. 5,585,787, which is a continuation-in-part of application No. 07/803,972, Dec. 9, 1991, abandoned.

[51] Int. Cl.$^6$ ........................................................ G07D 7/00
[52] U.S. Cl. .............................. 340/825.33; 340/825.34; 235/380
[58] Field of Search ........................ 340/825.34, 825.44, 340/286.06, 311.1, 825.35; 235/380, 382, 382.5, 492

[56] References Cited

U.S. PATENT DOCUMENTS

| | | |
|---|---|---|
| 4,253,017 | 2/1981 | Whitehead . |
| 4,458,142 | 7/1984 | Berstein ............................ 340/825.35 |
| 4,614,861 | 9/1986 | Pavlov et al. . |
| 4,791,283 | 12/1988 | Burkhardt . |
| 4,868,376 | 9/1989 | Lessin et al. . |
| 4,918,631 | 4/1990 | Hara et al. . |
| 4,926,480 | 5/1990 | Chaum . |
| 4,928,001 | 5/1990 | Masada . |
| 4,959,788 | 9/1990 | Nagata et al. . |
| 4,960,982 | 10/1990 | Takahira . |
| 5,168,520 | 12/1992 | Weiss . |
| 5,192,947 | 3/1993 | Neustein . |
| 5,578,808 | 11/1996 | Taylor ..................................... 235/492 |
| 5,590,038 | 12/1996 | Pitroda .................................. 235/380 |

FOREIGN PATENT DOCUMENTS

| | | |
|---|---|---|
| 59-151259 | 8/1984 | Japan . |
| 2189741 | 11/1987 | United Kingdom . |

OTHER PUBLICATIONS

"The Very Smart Card: A Plastic Pocket Bank", H. Shogase, *IEEE Spectrum*, Oct. 1988, pp. 35–39.

*Primary Examiner*—Edwin C. Holloway, III
*Attorney, Agent, or Firm*—Blakely, Sokoloff, Taylor & Zafman LLP

[57] ABSTRACT

A programmable transaction card enables accessing a selected one of a plurality of different accounts with the same or different financial institutions through communication with an authorization center while providing important anti-fraud features. The transaction card includes a keyboard for selecting a desired account and for entering optional identification information for the card. The transaction card generates an account number corresponding to the selected account. The account number, together with the identification information, if entered, is presented in a form which is readable by a reader device but is not discernible by the human eye, e.g., by emulation of a magnetic strip. In an alternative embodiment, an optical reader can be used. Upon reading the account number and the identification information by the (e.g., magnetic) reader device during a transaction, the account number and the identification information are transmitted to the authorization center for verification and access to the selected account.

19 Claims, 3 Drawing Sheets

PROGRAMMABLE TRANSACTION CARD

RELATED APPLICATIONS

This is a continuation-in-part of application Ser. No. 08/236,169 filed May 2, 1994, now U.S. Pat. No. 5,585,787, which is a continuation-in-part of application Ser. No. 07/803,972 filed Dec. 9, 1991, now abandoned.

BACKGROUND OF THE INVENTION

1. Field of the Invention

This invention relates generally to financial transaction cards and, more specifically, to a programmable integrated circuit card for accessing a plurality of accounts.

2. Prior Art

At present, magnetic cards such as commercial credit cards are widely used for payments, cash advances, or other financial transactions through a communication system located at a retail store or a bank facility. Data for identifying the customer, such as an account number or other identifying data is magnetically stored on the card.

When a transaction is to be performed at a retail store, a customer hands his or her card to an employee of the retail store. The employee then either manually checks the account number against a list of bad account numbers which is published by the credit card company or scans the magnetic information into a communication device. In the first case, the employee has the responsibility for approving the credit card. This can lead to serious problems when a stolen credit card is presented for payment, since the lists are usually not up to date and are also hard to read. In the second case, the magnetic account and billing information is sent to the financial institution where it either accepted or declined. Since there is no method to check the authenticity of the purchaser, the financial institution must assume that the credit card user is the customer identified upon the card, unless they have been notified that the card is stolen or lost. This assumption leads to problems when a stolen credit card, which has not been reported, is utilized for the purchase of goods.

When a credit card is utilized in a bank in order to receive a cash advance, the transaction is handled by either a teller or an automated teller machine (ATM). In the case of a teller, the process described for a retail store is repeated. In the case of an ATM, the card is placed inside of the ATM and the credit card owner enters a person identification number (PIN) which is transmitted to the credit card company along with the transaction information. When the PIN is received by the credit company, the PIN is verified and, if correct, a determination is made to either allow or deny credit. When the PIN number is found to be incorrect, most credit companies send, to the credit card owner, a request to reenter the PIN number. Thus, the user of a stolen credit card will know that the PIN number that was entered was incorrect.

In an attempt to provide greater security for credit cards, integrated circuit (IC) chips have been embedded into the credit cards. An interface is arranged on the surface or edge of the IC card to allow external equipment to access the information stored in the card. Therefore, when the IC card is inserted into a terminal device installed at, for example, a bank or retail store, the IC chip in the card is electrically connected to the terminal through the interface. The IC chip is energized from the terminal through the interface, and an identification number is entered at a keyboard in the terminal. The identification number prestored in the IC chip is read out and compared with the entered identification number in the terminal so as to determine whether or not the two identification numbers match, and whether the authorized user of the card is presenting the card.

However, in a conventional IC card, the IC chip is simply embedded in the card body, so that the terminal device must be used to identify the card user. The cost of such terminal devices is relatively high and imposes a financial strain on retail stores with relatively little capital. In addition to this disadvantage, the card holder must enter the identification number in the presence of a store clerk, so that secrecy of the identification number cannot be guaranteed.

Several U.S. patents disclose the use of integrated cards that are used to access remote systems. U.S. Pat. No. 4,959,788 (Nagata et al.) discloses an IC card having a keypad, a display, and a memory unit. The keypad is used to enter transaction information which is then stored in the memory unit. When the card is inserted into an ATM, the card configures the ATM for the pre-entered transaction and thus saves the user time at the ATM.

U.S. Pat. No. 4,918,631 (Hara et al.) discloses a "smart" IC card that also has a calculator function. The card has a keypad which can be used to enter identification information. This identification information is compared to that stored in an internal memory and if there is a match, the card will be validated. Upon validation, a light emitting diode LED will be illuminated to indicate that the card is active. The merchant will then accept the card as a valid card. Because such a LED indicator is provided, an unauthorized user may enter identification information until the correct combination is determined and thus a lost or stolen credit card may be used until the loss of the card is reported to the credit card company.

U.S. Pat. No. 4,926,480 (Chaum) discloses a card that allows cryptographically secure transactions between a tamper resistant part of the card and an external system by the IC card. The card enables a user to enter information on a keypad located thereon. The card can be used to access several different types of computer systems. The tamper resistant part contains coded information which will allow a secure protocol to be established between the tamper resistant part and the external system. The user inputs access enabling information upon the keypad which is then checked against the coded information. If there is a correspondence between the two bits of information, the card is enabled. The card is then allowed to communicate with an external system via a secure protocol.

U.S. Pat. No. 4,928,001 (Masada) discloses an integrated circuit IC card that has multiple user sections. By entering the appropriate identification code, access to one or more of the user sections is allowed.

U.S. Pat. No. 4,960,982 (Takahira) discloses an IC card comprising a microprocessor which accepts access information and checks this information with a prestored key. If the information matches the key, then the card is enabled and allows access to a mass storage device.

SUMMARY OF THE INVENTION

In general terms, the invention provides a programmable transaction card for accessing a selected one of a plurality of different transaction accounts, such card comprising: means for selecting one of the plurality of accounts to be accessed; means for generating an account number corresponding to the selected account; intormation presentation means for presenting the account number in a format that is machine-readable external to the transaction card; and control means for presenting the account number for a predetermined period of time, after which time the account number is no longer presented.

In accordance with one aspect of the invention, a method is provided for communicating between a financial transaction authorization center and a holder of a programmable transaction card so as to provide verification of the transaction card and to provide access to a selected one of a plurality of accounts, said method comprising the steps of: entering an identification number on a keyboard of the transaction card; selecting one of said plurality of accounts; generating an account number corresponding to said selected account; presenting said identification number and said account number in a machine-readable form that is not discernible to the human eye for a predetermined period of time, after which time said identification number and said account number are no longer presented; using a reader device to read the presented identification number and account number; transmitting said identification number and said account number read by said reader device to said authorization center; and verifying said identification number and said account number at said authorization center.

In a preferred embodiment, the identification number and completed account number are temporarily presented by emulating the time-varying magnetic field that would be produced if said numbers were recorded on a magnetic strip and swiped through a reader. The numbers may then be read by a reader device in the form of a conventional magnetic strip reader.

Advantageously, the method of the invention further comprises generating a tone after the entry of said identification number or another secret code on said keyboard and transmitting said tone to the clearing house. Alternatively, or in addition, the method further comprises generating a preprogrammed identifying tone in response to making an entry on said keyboard in response to a random request for that entry from the clearing house.

In accordance with a further aspect of the invention, a programmable transaction card is provided for accessing a selected one of a plurality of different accounts through communication with an authorization center for said accounts, wherein the transaction card comprises: means for selecting one of the plurality of accounts to be accessed; means for entering identification information for the card; means for generating an account number corresponding to the selected account; information presentation means for presenting said identification information and said account number in a machine-readable form which is not discernible by the human eye; control means for presenting said identification information and said account number for a predetermined period of time, after which time said identification number and said account number are no longer presented.

The information retaining means can comprise a central processor and associated memory. In a preferred embodiment, the information presentation means comprises a magnetic strip emulation controller and an inductive coil.

In an advantageous embodiment, the card further comprises a raised or embossed basic account number imprinted on a face of the card and corresponding to a stored basic account number, account number completing digits located on said card adjacent to, and at the end, of the raised account number so that said raised account number and said completing digits constitute a completed account number which is visible to a user, and account number varying means for varying the account number completing digits. In one embodiment, the account number varying means comprises at least one thumbwheel carrying raised digits corresponding to said terminal digits.

According to a further advantageous embodiment, the card further comprises speaker means for generating tones corresponding to said identification number.

In an alternative embodiment, the card further comprises speaker means for generating preprogrammed identification tones in response to depressing selected keys of the keyboard. Other features and advantages of the invention will be set forth in, or apparent from, the following detailed description of preferred embodiments of the invention.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices and circuits are omitted so as to not obscure the description of the present invention with unnecessary detail.

Figure 1:
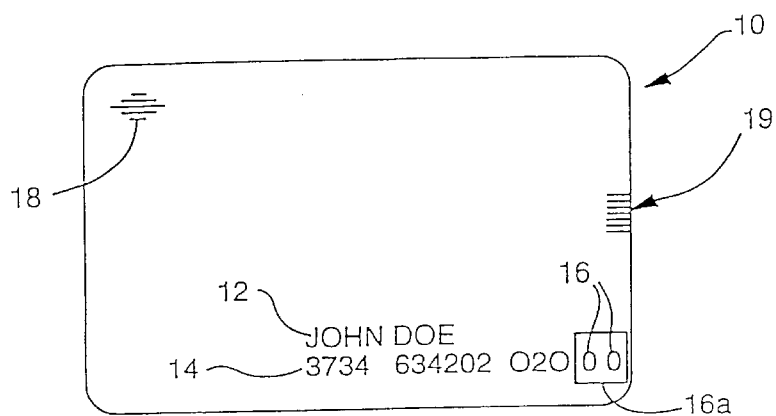
FIG. 1 is a front elevational view of a transaction card constructed in accordance with the invention.
Figure 2:
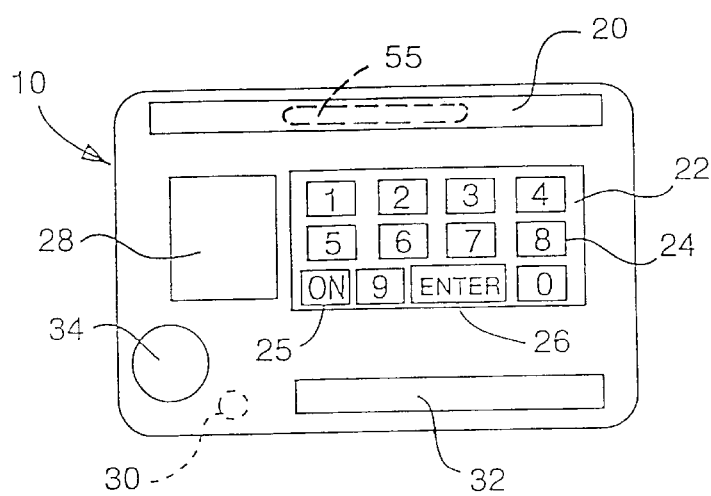
FIG. 2 is a rear elevational view of the transaction card of FIG. 1.
Figure 3:
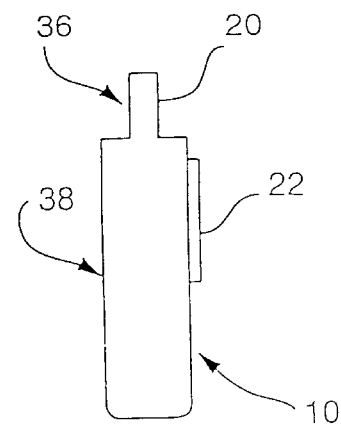
FIG. 3 is a side elevational view of an alternative embodiment of the transaction card of FIG. 1.

Referring to FIGS. 1, 2 and 3, an exemplary embodiment of the invention in the form of a programmable transaction card, generally denoted 10, is illustrated. The front face of card 10 is similar to that of many conventional credit cards in that the card 10 has embossed letters 12 which identify the authorized user of the card 10. Further, there are embossed account numbers 14 on card 10 which identify a particular transaction account. Such embossed numbers are necessary if card 10 is to be used with conventional paper transaction records wherein the card is used to make a physical impression on the record. However, the need for embossed account numbers is diminishing as more point-of-sale terminals simply read the magnetically encoded information from the card and use such information to print a transaction record. Moreover, conventional magnetically encoded transaction cards are beginning to be replaced in some applications by so-called "smart cards" that contain information in an integrated circuit chip within the card. Readers for such cards transfer data directly to and from the circuit chip, further obviating the need for embossed data on the card. Such "smart cards" are likely to see more widespread use in the future.

In accordance with one embodiment of the invention, the last two digits, denoted 16, of account number 14 embossed on card 10 can be changed to any value from 00 to 99. The ability to change the embossed numbers 14 on card 10 allows the use of a single card to access many different credit accounts while also allowing the card to be used with conventional paper transaction records. In particular, in one embodiment, accounts at many different credit card companies or at different banks within the credit system of a credit company may be accessed with a single card. To this end, the last two digits 16 may be used to indicate different credit companies or banks and a specific combination of numbers, e.g., 01, may be used to indicate one credit card company or bank while another, e.g., 02, may be used to indicate another credit card company or bank or a different account with the first credit card company.

A speaker 18 is also provided on the card 10. This speaker allows the card to broadcast a tone corresponding to the particular identification number over conventional telephone lines by using tones associated with the particular digits of the identification number after the identification number or another secret code has been entered. However, in accordance with an embodiment described below, the ability to generate a particular tone in response to a random request is used as a check by the credit company that the person using the card is authorized to do so.

An input/output port 19 may be provided on the card so that conventional terminal equipment may be utilized to access account and identification information which is stored in the memory of the card.

The back of the card 10 has a region 20 which aligns with the read head of a conventional magnetic card reader. A transducer 55, such as an inductive coil, is disposed within card 10 behind region 20 to generate a time-varying magnetic field corresponding to the account number 14 and, optionally, an authorization code that is entered by the card user. This time-varying magnetic field appears to the card reader as if a conventional magnetically encoded card had been "swiped" through the reader. Signals representing the data to be transferred to the reader are output serially, thereby emulating the data encoded on a magnetic strip. Suitable analog circuitry is provided in a magnetic strip emulation controller for driving the inductive coil to generate a magnetic field pattern which can be read and interpreted by a conventional magnetic read head in the card reader. Analog circuitry suitable for this application is described in U.S. Pat. No. 4,868,376 to Lessen, et al, which is incorporated herein by reference.

The card 10 has a numerical pad 22 having numerical keys 24, a power on key 25, and an enter key 26. The pad 22 is used to enter the particular credit company, i.e. the last two digits of the account number 14, and the authorization code. A solar cell 28 is provided for recharging a battery 30. Battery 30 is a typical rechargeable battery and provides power to the systems of the card 10. A display 32 is provided for displaying the account number 14 which has just been entered as well as other information relating to a transaction. A wheel 34 is located on the back of card 10 and allows the last two digits 16 of account number 14 to be changed as desired. These digits 16 are visible through a window 16a on the front of the card 10. Alternatively, two thumbwheels, each containing the digits 0 to 9, can be used to generate the two digits 16.

Figure 7:
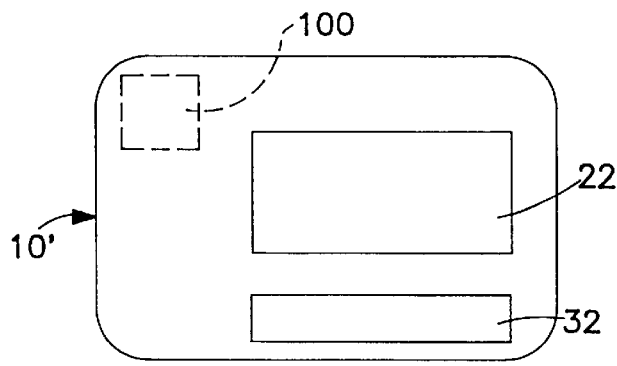
FIG. 7 is an elevational view of a transaction card constructed in accordance with an alternative embodiment of the invention.

FIG. 7 illustrates a "smart card" 10' embodying the present invention. Card 10' includes an integrated circuit chip 100 in accordance with industry standards so as to communicate with a standardized "smart card" reader. Card 10' includes keypad 22, display 32 and other features of card 10 as previously described. In this case, emulation of a magnetic strip is not required. Instead, the selected account number is presented to the "smart card" reader through circuit chip 100 in the same format as used in a single-account "smart card".

In a preferred embodiment, the card 10 has substantially the same thickness of about 0.8 mm, i.e., the thickness of conventional credit cards, and meets other ISO standards associated with such credit cards. FIG. 3 illustrates an alternative embodiment where the card 10 has a varying thickness in order to accommodate the system electronics while still permitting the card to be read by conventional magnetic card readers. As illustrated in this embodiment, the card 10 has an 0.8 mm thick projecting portion 36 which includes region 20 and a thicker body portion 38 which houses the system electronics. The projecting portion 36 allows magnetic strip 20 to be inserted into conventional magnetic readers. By having a thicker body portion 38, cheaper electronics can be used and the card 10 can be manufactured at a reduced cost. In yet another embodiment, a card portion having the same form factor as a conventional credit card may be inserted into a separate case that contains the keyboard, display, speaker and the majority of the electronics and power supply.

Figure 4:
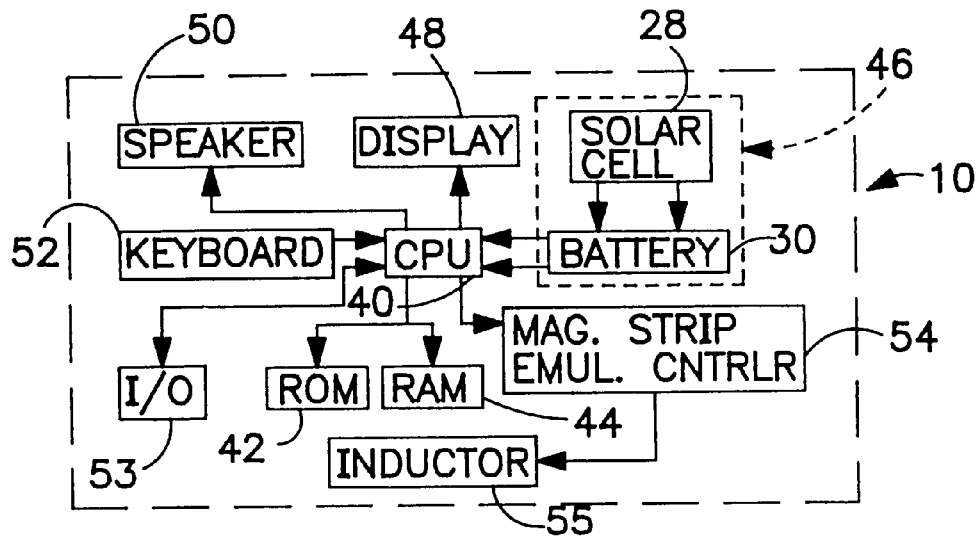
FIG. 4 is a block diagram of the circuits utilized in the transaction card of FIG. 1.

The major systems and circuits utilized in card 10 are illustrated in FIG. 4. As may be seen, the card is composed of a central processing unit (CPU) 40, a read only memory (ROM) 42, dynamic memory (RAM) 44, a power supply system 46, a display control circuit 48, a speaker control circuit 50, a keyboard circuit 52, an input/output port controller 53, a magnetic strip emulation controller 54 and a transducer 55. The power supply system comprises the solar cell 28 and the rechargeable battery 30. The CPU 40 receives power from the power supply system 46 and distributes the power to the other systems and circuits. Additionally, the CPU 40 controls the above systems and circuits by a programmed sequence of steps which is stored in the ROM 42. For clarity, the operation of the above circuits will be explained in conjunction with the operation of the card as illustrated in the flow chart shown in FIG. 5 and described below.

Figure 5:
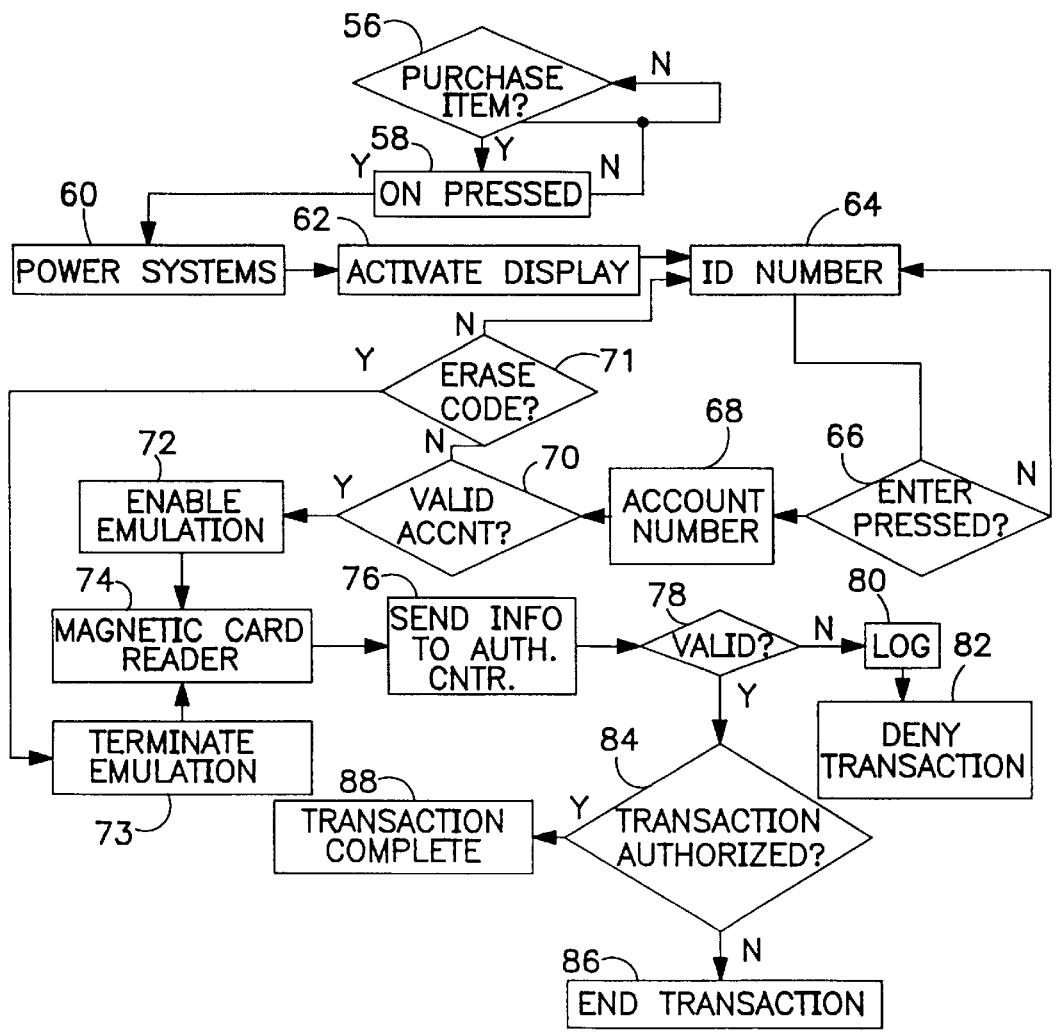
FIG. 5 is a flow chart which illustrates a typical transaction using the card of FIG. 1.

Considering the overall operation of the credit card 10, a typical transaction is illustrated in FIG. 5. The first step, as indicated in decision diamond 56, is to determine whether to proceed with a transaction, in this case a purchase. If no purchase is desired, the card is not activated. In the case where a purchase is desired, the card user will press the ON key 25, as is indicated by operation block 58. In response to pressing of the ON key 25 by the user, the CPU 40 will supply power to the systems and circuits identified above, as indicated by operation block 60. Additionally, the numerical keys 24 and enter key 26 will be enabled by the keyboard controller circuit 52.

If entry of a PIN or other identification number is required, the display control circuit 48 will display a message which states "please enter ID number" or will provide an equivalent prompt to the user on display 32, as indicated by operation block 62. The card user will then enter his or her identification number as indicated by block 64. Next, the keyboard controller circuit 52 will scan the keyboard to see if the enter key 26 is pressed as indicated by decision diamond 66. When the enter key 26 is pressed, the identification number will be stored in RAM 44 by the CPU 40. If the card user wishes to "erase" any information being presented as a magnetic strip emulation at region 20, a predetermined erase code, such as a series of zeroes, may be entered, as indicated at decision diamond 71, in order to terminate magnetic field generation as indicated by block 73, discussed further below.

The display control circuit 48 will then display a message which states "please select an account" or provides an equivalent prompt to the user on display 32, as indicated by block 68. The desired account may be selected by any predetermined key sequence as established by the control program loaded into CPU 40. In one embodiment, this may be a two digit number (i.e., 00 to 99). The keyboard controller circuit 52 will then receive the next two digits entered and send this information to the CPU 40. The CPU 40, in turn, will use the two digit code to identify a credit account stored in ROM 42. If there is no account number which corresponds to the entered two digit code, the CPU 40 will request the display control circuit 50 to re-display the prompt indicated by block 62. If the account is valid, as indicated by decision diamond 70, the CPU 40 will store the account number 14 in the RAM 44. The complete account number may comprise a basic account number that is then completed with the digits entered on the keyboard. Alternatively, the entire account number may be retrieved from storage or otherwise generated based on the key entry. It should be understood that a single variable digit (ranging from 0 to 9) can be used to provide ten choices although the use of multiple digits is preferred because-the much greater number of choices provided helps combat fraud. In one embodiment, the card can be preprogrammed when issued to display on display 32 the credit card company (using an abbreviation or acronym) corresponding to the digit or digits selected. In an alternative embodiment, the card may be provided with keys that are individually labeled for specific accounts. Pressing a particular key will retrieve the corresponding account number.

Figure 6:
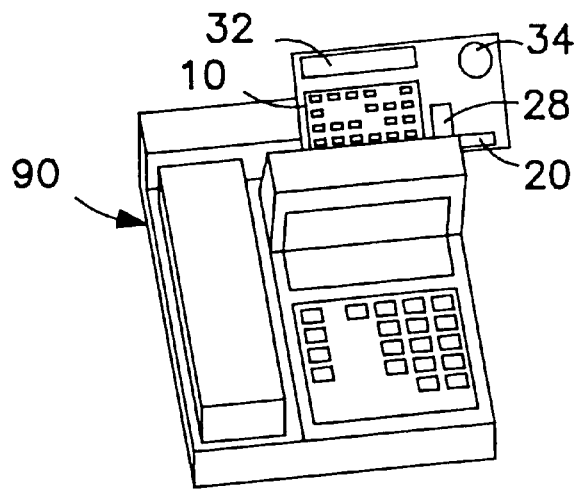
FIG. 6 illustrates the location of the magnetic card interface during the reading transaction.

The next step is to emulate a magnetic strip encoded with the account number 14 and, if needed, the identification number, as indicated by block 72. As previously described, magnetic strip emulation controller 54 controls transducer 55 to generate a time-varying magnetic field which emulates the account number 14 and the identification number in region 20 so that a clerk may place the card 10 in a conventional magnetic card reader as indicated by block 74. As shown in FIG. 4, data to be communicated is output from the processor 40 and is converted by the magnetic strip emulation controller 54. Magnetic strip emulation controller 54 outputs a signal to drive inductor 55 that generates a magnetic field pattern which can be read by a conventional card reading device 90, as shown in FIG. 6 of the present application. Signals representing the data to be communicated are output serially, thus emulating data read from swiping a conventional card with data encoded on a magnetic strip. The signals are repeated cyclically for a predetermined period of time so that reading device 90 will have sufficient opportunity to read the entire data sequence. Alternatively, a key entry may be used to generate the emulation data once the card is positioned in the reader.

In order to ensure that the data is only temporarily presented in accordance with one of the security features of the present invention, after a certain predetermined period of time sufficient for completion of the transaction, for example, five minutes, the processor 40 will supply a signal to the magnetic strip emulation controller 54 which terminates the generation of magnetic fields by transducer 55, as indicated in step 73. This may also be manually effected by entering an erase code in the keyboard as discussed above.

As previously discussed, a "smart card" embodying the present invention does not require magnetic strip emulation. In this case, the selected account number is retrieved from memory in the same manner as just described, but is presented by means of the circuit chip reader interface.

The card reader will typically dial an authorization center or other clearing house associated with the account number 14 and will transmit the account number 14 as well as the identification number, if needed, as indicated by block 76. The receiving terminal with which the reader communicates can be at a conventional authorization center, or can be at a credit card company which acts as a clearing house for its accounts at, e.g., a number of different banks, or can be at a credit clearing house established for the purpose of servicing the accounts of different credit card companies, i.e., to act as a clearing house for a number of different credit cards. In general "authorization center" refers to any processing center, whether or not remotely located from the card reading device, at which a particular attempted transaction is authorized or denied. Upon receiving the account number 14, the authorization center will verify the account against its files and either accept the card as valid or invalid, as indicated by decision diamond 78. If the account is invalid, the transaction will be declined, the attempted transaction will be logged as indicated by block 80 and the transaction will be denied, as indicated in block 82.

The ability to transmit the identification information along with the account number to the authorization center for verification removes the possibility of collusion between the store clerk and a potential thief of a transaction card. It will also cut down on fraud by allowing only authorized users to access the account. Additionally, by having the authorization center verify the identification information, neither the transaction card user nor the clerk will know if the identification information that was entered is incorrect or if the available credit will or will not cover the purchase. Thus, the only entity to know whether an incorrect identification is used is the authorization center.

Continuing with a consideration of the normal manner of use of the transaction card 10, if the identification is valid, as indicated by the "Y" branch of decision diamond 78, then a decision is made as to authorization of the transaction, e.g., whether or not there is sufficient available credit, as indicated by decision diamond 84. If the transaction is denied, the authorization center will send a message to the card reading device 90 to indicate that the transaction has been terminated, as indicated by block 86. If the transaction is authorized, a message is sent to the card reading device 90 to indicate such authorization, indicated by the "Y" branch of decision diamond 84. The transaction is then completed, as indicated by block 88.

Card 10 also allows transactions to be conducted by imprinting a copy of the account number 14 on a signed bill. In this situation, the credit card user will turn wheel 34 so that the last two digits 16 represent the account that is to be debited. Then the clerk will imprint a copy of the account number 14 in a conventional fashion.

In an alternative embodiment, a conventional optical scanner (not shown) can be used to read the account number 14 and identification information into the scanner. In this embodiment, the scanner may read information from the embossed numbers 14 or the display 32. When the information is input into the scanner, the transaction will be conducted as described above. In a further alternative embodiment, as already discussed, a "smart card" circuit and compatible reader may be used to transfer account and identification information.

As stated above, card 10 may be provided with a input/output port 19. This port 19 can, in an alternative embodiment, be utilized to allow a conventional terminal to read the account number 14 including the last two digits 16 and identification information directly from the ROM 42 and RAM 44 of the card 10 and this information can be transmitted to a credit company or to a clearing house for a number of credit card companies. Thus, conventional terminals can also be utilized in connection with card 10 to read out the information which is read out by a magnetic reader in the embodiment described above. After the account number 14 and the identification information is read into the terminal, the transaction will proceed as described above from block 76.

The card 10 also allows for secure telephone transactions which utilize the card 10. In a typical prior art telephone transaction, the sales representative requests the cardholder to read the account number off of the credit card and there is no way to identify whether the cardholder is the authorized user of a credit card. By utilizing the speaker 18 on the card 10 and an associated tone generator, the card can be used to generate tones associated with the keys 22. In operation, the sales representative will take the order of the card holder and request by telephone that the credit card company interface with the cardholder to provide verification that the cardholder is indeed authorized to use the card. To provide this verification, the credit card company first requests that the cardholder press the keys associated with the card identification number. Upon pressing of the keys 22 by the cardholder, distinct tones are generated by the speaker. The credit card company will receive the tones and be able to determine if the tones, which correspond to the identification number, match with the tones that are stored at the credit card company (or clearing house) for that particular account. By providing the credit card company with the ability to verify the identification information, the likelihood of a lost or stolen card 10 being successfully used is significantly reduced since the authorized cardholder and the credit card company are the only two people who know the correct identification number. of course, when an unauthorized user of the card enters an incorrect identification number, the tones that will be generated will be incorrect or invalid and the credit card company will have been given notice of an unauthorized attempt to access credit on the particular account and can take remedial action to protect the account. In an alternative embodiment, the credit card company or clearing house can request of a cardholder who telephones the company to press certain keys selected at random and thus automatically generate corresponding preprogrammed tones over the telephone. This prevents an authorized person who has secretly recorded the card identification tones but does not have the card itself from effectively using the card.

The present invention is not limited to use in conducting credit card transactions, but may also be used for any other type of financial transaction involving access to an account from a remote terminal. For example, the invention may also be advantageously employed to conduct debit card transactions. In particular, the invention may be embodied as a "cash card", which can display to the user the remaining balance on the card by means of display 32. Furthermore, the present invention is well suited for use as an ATM card. In this regard, ATM transactions can be expedited and can be conducted with greater security since the user's PIN number can be entered into the card before the user approaches the ATM terminal.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A method for communicating between a financial transaction authorization center and a holder of a transaction card so as to provide verification of the transaction card and to provide access to a selected one of a plurality of accounts, said method comprising the steps of:

selecting one of said plurality of accounts;

generating within the transaction card an account number corresponding to said selected account;

presenting said account number in a machine-readable form that is not discernible to the human eye for a predetermined period of time approximating a time required to complete a transaction;

using a reader device to read the presented account number;

after said predetermined period of time, supplying a signal to terminate said step of presenting the account number;

transmitting said account number read by said reader device to said authorization center; and verifying said account number at said authorization center.

2. The method as claimed in claim 1 wherein said account number are presented as a time-varying magnetic field and wherein said account number is read by a magnetic reader device.

3. The method of claim 1 further comprising the step of entering an identification number on a keyboard of the transaction card.

4. A method as claimed in claim 3 further comprising the step of generating a preprogrammed identifying tone in response to making an entry on said keyboard in response to a random request for that entry from the authorization center.

5. The method as claimed in claim 3 further comprising the step of generating a tone after the entry of said identification number on said keyboard and transmitting said tone to said authorization center.

6. A transaction card for accessing a selected one of a plurality of different transaction accounts, said transaction card comprising:

means for entering identification information;

means for selecting one of the plurality of accounts to be accessed;

means for generating an account number corresponding to the selected account;

information presentation means for presenting said identification information and said account number in a machine-readable form which is not discernible by the human eye;

control means for terminating presentation of said identification information and said account number after a predetermined period of time approximating a time to complete a transaction.

7. The card recited in claim 6 wherein said information presentation means comprises an inductive coil.

8. The card recited in claim 6 wherein said means for generating an account number comprises a central processor and associated memory.

9. The card recited in claim 6 further comprising speaker means for generating preprogrammed identification tones in response to depressing selected keys of said keyboard.

10. The card recited in claim 6 further comprising speaker means for generating tones corresponding to said identification number.

11. The card recited in claim 6 further comprising a raised basic account number imprinted on a face of said card and corresponding to a basic account number, account number completing digits located on said card adjacent to, and at the end of, said raised basic account number so that said raised basic account number and said completing digits constitute a completed visible account number, and account number varying means for varying said account number completing digits.

12. The card recited in claim 11 wherein said account number varying means comprises at least one thumbwheel carrying raised digits corresponding to said account number completing digits.

13. A method of conducting a financial transaction comprising the steps of:

provides an authorized user of a financial account with an electronic transaction card having a keyboard and a memory;

entering user identification information on the keyboard;

entering account identification information on the keyboard;

retrieving an account number from the memory;

presenting the account number and user identification information in a format that is temporarily machine-readable external to the transaction card;

communicating the machine-readable account number and user identification information to an authorization center; and terminating the step of presenting the account number and user identification number after a predetermined period of time approximating a time to complete a transaction.

14. The method of claim 13 wherein a plurality of account numbers are stored in said memory and said account identification information selects one of said plurality of account numbers for retrieval.

15. A programmable transaction card for accessing a selected one of a plurality of different transaction accounts, said transaction card comprising:

means for selecting one of the plurality of accounts to be accessed;

means for generating an account number corresponding to the selected account;

information presentation means for presenting said account number in a format that is machine-readable external to the transaction card;

control means for terminating presentation of said account number after a predetermined period of time approximating a time to complete a transaction.

16. The card recited in claim 15 wherein said information presentation means comprises an integrated circuit.

17. The card recited in claim 15 wherein said information presentation means comprises an inductive coil.

18. The method of claim 17 further comprising the steps of:

entering user identification information on the keyboard;

presenting the user identification information in said format that is temporarily machine-readable external to the transaction card; and communicating the user identification information to said authorization center.

19. A method of conducting a financial transaction comprising the steps of:

providing an authorized user of a financial account with an electronic transaction card having a keyboard and a memory;

storing a plurality of account numbers in said memory;

entering account identification information on the keyboard;

retrieving one of the plurality of account numbers from the memory;

presenting the retrieved account number in a format that is temporarily machine-readable external to the transaction card;

communicating the machine-readable account number to an authorization center; and terminating the step of presenting the account number after a predetermined period of time approximating a time to complete a transaction.

* * * * *